(12) United States Patent
Chang et al.

(10) Patent No.: US 6,917,932 B2
(45) Date of Patent: Jul. 12, 2005

(54) DYNAMIC OPTIMIZATION OF MULTI-FEATURE QUERIES

(75) Inventors: Yuan-Chi Chang, Ossining, NY (US); Christian Alexander Lang, Santa Barbara, CA (US); John Richard Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/137,032

(22) Filed: May 1, 2002

(65) Prior Publication Data

US 2003/0208484 A1 Nov. 6, 2003

(51) Int. Cl.$^7$ .............................................. G06F 17/30
(52) U.S. Cl. ............................... 707/2; 707/1; 707/10; 707/104.1
(58) Field of Search .................. 707/1–104.1, 200–205; 717/100, 114–116

(56) References Cited

U.S. PATENT DOCUMENTS

| | | | | |
|---|---|---|---|---|
| 5,058,034 A | * | 10/1991 | Murphy et al. | 706/25 |
| 5,761,538 A | * | 6/1998 | Hull | 712/300 |
| 5,893,095 A | * | 4/1999 | Jain et al. | 707/6 |
| 6,154,746 A | * | 11/2000 | Berchtold et al. | 707/100 |
| 2003/0088563 A1 | * | 5/2003 | Yamane et al. | 707/5 |

OTHER PUBLICATIONS

Copperman et al., "Efficient and cost–effective content provider for customer relationship management (CRM) or other applications ", US Patent Application Publication, 2003/0115191 A1.*

Balke, W–T, et al., *Applications of Quick–Combine for Ranked Query Models*, DELOS Workshop, 2000.

Chaudhuri, Surajit, et al., *Optimizing Queries over Multimedia Repositories*, SIGMOD, 1996, pp. 91–102.

Chaudhuri, Surajit, *An Overview of Query Optimization in Relational Systems*, PODS, 1998, pp. 1–10.

Ciaccia, Paolo, *Processing Complex Similarity Queries with Distance–based Access Methods*, EDBT, 1998, pp. 9–23.

Fagin, Ronald, et al., *Optimal Aggregation Algorithms for Middleware*, PODS, 2001, ACM, 1–15 pages.

Fagin, Ronald, et al., *Combining Fuzzy Information from Multiple Systems*, PODS, 1996, pp. 216–226.

Guntzer, Ulrich, et al., *Optimizing Multi–Feature Queries for Image Databases*, Proceedings of the 26$^{th}$ VLDB Conference, Cairo, Egypt, 2000, pp. 1–10.

* cited by examiner

*Primary Examiner*—Luke S Wassum
*Assistant Examiner*—Linh Black
(74) *Attorney, Agent, or Firm*—F. Chau & Associates, LLC

(57) ABSTRACT

The present invention provides an elegant solution for processing multi-feature queries, which considers the differing access costs associated with each feature. Access cost is a critical factor in determining how individual features should be processed in terms of retrieving through sorted or random access, and, hence, in minimizing the overall query response time. The present invention operates dynamically during query processing and seeks to minimize the total query cost in terms of number of features retrieved and cost for access. It works by evaluating different combinations of feature access plans (sorted and random access) according to the number of retrieved features and forward access costs, and it selects the lowest cost plan. Experimental results on practical data show a significant speed-up in multi-features queries using the proposed solution.

17 Claims, 12 Drawing Sheets

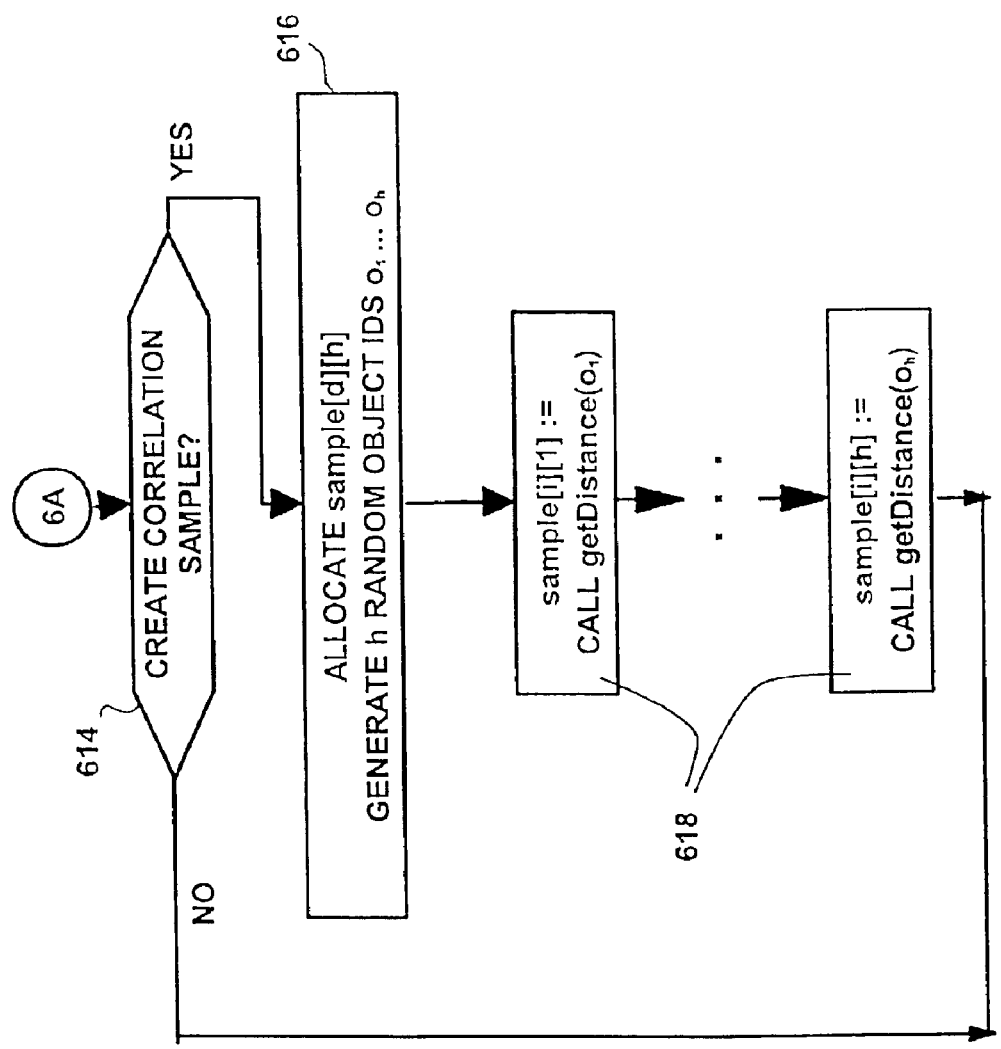

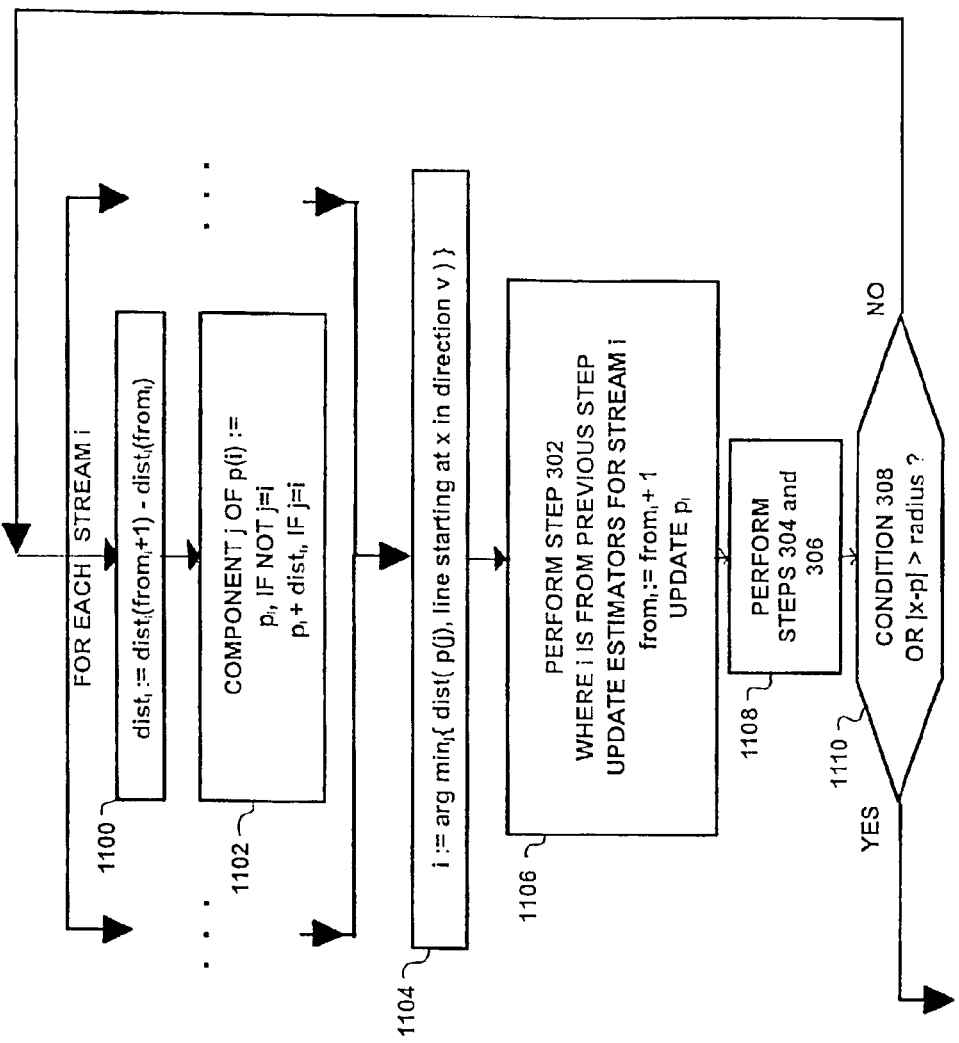

DYNAMIC OPTIMIZATION OF MULTI-FEATURE QUERIES

FIELD OF THE INVENTION

The present invention relates to multimedia database systems and, more particularly, to the operation of similarity search for multimedia objects with several feature attributes. It details algorithms which perform on-the-fly optimizations based on cost predictions whereby reducing overall response time.

BACKGROUND OF THE INVENTION AND DESCRIPTION OF THE PRIOR ART

Objects stored in multimedia databases can be described by a number of feature attributes such as color, texture, or shape. Instead of retrieving exact matching objects, multimedia database queries are targeted at retrieving the k best matching objects along with their "similarity distance". The best match is to be returned first, the second-best match second, and so on with the similarity distance increasing. For example, when searching for a red image, the image which contains the highest amount of red color should be returned first, followed by an image with the next-highest amount of red. In this example, only one feature attribute is utilized, namely the image color. In typical multimedia applications, several attributes have to be considered simultaneously. For example, when searching for images similar to a given query image, that image's color, texture, and shape attributes might be extracted and used during the search process to improve the quality of the result.

Other application areas of multi-feature queries are (Wolf-Tilo Balke, Ulrich Güntzer, and Werner Kießling, "Applications of Quick-Combine for Ranked Query Models," Proceedings of the First DELOS Workshop on Information Seeking, Searching and Querying in Digital Libraries, Zurich, Switzerland, 2000, pp. 41–46):
Feature lists within the SQL/MM standard,
Content management in digital libraries,
Enterprise information portals,
Knowledge management systems, and
Multi-classifier combination.

Different attributes are often stored at different locations or indexed by different indexing schemes due to the use of legacy systems or performance considerations. Therefore, an additional layer may be required to combine the search results for each single attribute into an overall search result. For example, query support for color similarity and shape similarity is provided but the user wants to find images that are red AND round. The similarity distance might be defined as the maximum of the similarity distances for color and for shape. An image which is very red but not round will then get a higher distance and consequently a lower rank than a very red and round image. Such a function that combines distances in order to yield a new overall distance, is also called aggregation function.

Since many multimedia applications are highly interactive, it is desirable to allow for an incremental retrieval. For example, if the user requests the best matches for a given image, the first 10-best matches should be returned within seconds. While the user inspects these matches, the system can continue to retrieve the 10 second-best matches in the background and present them to the user on request. It is important to note that a response "within seconds" prohibits an exhaustive search over the whole data repository. Instead of modeling the ranked feature attributes and the ranked results as tables, they are therefore often modeled as "ranked streams" where only the front part of each stream is known.

Similarly, previous work in this area can be categorized into two classes: table-based and incremental (or stream-based). Table-based approaches assume that a complete ranking is given for the feature attributes to be combined. Incremental approaches assume that only the first few rankings are known but more can be requested later.

If the complete rankings of the feature attributes are given as tables, common cost-based optimization techniques (Surajit Chaudhuri, "An Overview of Query Optimization in Relational Systems," Proceedings of the 17th ACM SIGACT-SIGMOD-SIGART Symposium on Principles of Database Systems, 1998, Seattle, Wash., pp. 34–43) can be applied to compute the join of the tables followed by a sorting operation on the combined similarity distances. Even though this approach takes the cost into account, it is not feasible in an interactive setting because the response time is too long.

For that reason, much previous work focused on incremental solutions. Most solutions are based on Fagin's Algorithm (FA) (Ronald Fagin, "Combining Fuzzy Information from Multiple Systems," Proceedings of the 15th ACM SIGACT-SIGMOD-SIGART Symposium on Principles of Database Systems, 1996, Montreal, Canada, pp. 216–226). In FA, each ranked feature attribute can be seen as an incoming stream. The goal is to generate an outgoing stream of objects whose ranks are computed using a monotonic aggregation function. Accesses to the head of the stream (next best match for this feature) pay a sequential read cost, whereas accesses to any object in the stream (via object ID) pay a random read cost. FA tries to minimize the overall number of object reads as follows: since the aggregation function is assumed to be monotonic, it is enough to read k objects sequentially from each stream (where k is the number of results desired). The monotonicity guarantees that the overall top-k objects are among those read objects. In order to compute the rank of each read object, random accesses are performed to the streams where that object was not yet seen. Note that FA assumes that the sequential and random access costs are constant for all streams and can therefore not adapt to different access costs.

Several improvements of this algorithm were suggested in order to reduce the number of objects to read sequentially from each incoming stream during query processing. Examples include the Threshold Algorithm (TA) (Ronald Fagin, Amnon Lotem, and Moni Naor, "Optimal Aggregation Algorithms for Middleware," Proceedings of the ACM Symposium on Principles of Database Systems, 2001, pp.102–113), and the Quick-Combine Algorithm (QA) (Ulrich Güntzer, Wolf-Tilo Balke, and Werner Kießling, "Optimizing Multi-Feature Queries for Image Databases," Proceedings of the 26th VLDB (Very Large Database) Conference, Cairo, Egypt, 2000, pp. 419–428). Instead of reading k objects from each stream, TA stops reading as soon as k objects were found whose aggregated distance is less than a certain threshold. This threshold is computed by combining the distances of the last sequentially read object of each stream. Note that the threshold increases with each sequential read access since the distances are monotonically increasing and the combination function is monotonic. QA uses a similar idea as TA but tries to reach the termination condition faster. Since the stream whose distance increases most will cause the highest increase in the threshold value, QA tries to read more objects from this stream. It is therefore adaptive with respect to the distance distribution but not with respect to the cost: a stream that can be expected to increase the distance most, may still need to be avoided if its read cost is too high.

Other approaches try to minimize the number of object reads by combining the index structures of each feature attribute into a common indexing scheme (Paolo Ciaccia, Marco Patella, and Pavel Zezula, "Processing Complex Similarity Queries with Distance-based Access Methods," Proceedings of the 6th International Conference on Extending Database Technology, Valencia, Spain, 1998, pp. 9–23) which is prohibitive in distributed settings.

It is important to note that reducing the overall number of ranked object reads is not necessarily the best way of reducing the overall query response time. As an example, ranking objects according to shape might be much more expensive than color-based ranking. It is therefore preferable to read more color-ranked objects than shape-ranked objects in order to answer the query. A different query plan may access fewer overall objects but result in a higher response time because it causes more shape-ranked object reads.

The only work that takes the access cost for ranked multi-feature queries into account (Surajit Chaudhuri and Luis Gravano, "Optimizing Queries over Multimedia Repositories," Proceedings of the International Conference on Management of Data, Montreal, Quebec, Canada, 1996, pp. 91–102) is a hybrid between the table-based and the incremental approaches. There, the optimization is performed before query execution and may not lead to a query plan with minimal cost since it is based on Fagin's first algorithm. Furthermore, the work is restricted to a small number of aggregation functions and does not easily extend to incremental query processing. Worse, for certain data distributions, the algorithm does not read enough objects for each feature attribute and can therefore not yield any result. This problem occurs because the query plan is computed statically before the query execution.

The present invention proposes a dynamic query optimization scheme that takes different access costs into account while at the same time allowing for incremental and distributed query processing. "Dynamic" means that the optimization decisions are made while the query is executed rather than in advance. This leads to better educated cost predictions and thereby more efficient query plans.

SUMMARY OF THE INVENTION

The present invention provides an elegant solution for processing multi-feature queries, which considers the differing access costs associated with each feature. Access cost is a critical factor in determining how individual features should be processed in terms of retrieving through sorted or random access, and, hence, in minimizing overall query response time. The present invention operates dynamically during query processing and seeks to minimize the total query cost in terms of number of features retrieved and cost for access. It works by evaluating different combinations of feature access plans (sorted and random access) according to the number of retrieved features and forward access costs, and it selects the lowest cost plan.

According to a first aspect of the invention, there is provided a method for optimally performing a similarity search for a query object. The similarity search use a data stream for each feature attribute, and the steams are sorted in distance order. The method includes the step of determining a query plan using a cost-aware model. The query plan is executed to obtain at least one object using at least one of the data streams. Information related to the similarity search is returned once the distance of the first object obtained is at most equal to an aggregate distance of the highest distances of objects so far obtained from each of the data steams. According to a second aspect of the invention, determining the query plan includes identifying an access sequence. According to a third aspect of the invention, this step of identifying an access sequence includes determining a location on an equi-threshold line with the lowest accumulated estimated cost, and generating the query plan to reach the location on the equi-threshold line.

According to a fourth aspect of the invention, each of data streams has a cost estimator. These cost estimators are used by the cost-aware model. According to a fifth aspect of the invention, each cost estimator used by the cost-aware model includes a sequential cost function and a random cost function. According to a sixth aspect of the invention, some of cost estimators are based on correlation samples. According to a seventh aspect of the invention, some of the cost estimators are based on extrapolation from past costs.

These and other aspects, features and advantages of the present invention will become apparent from the following detailed description of preferred embodiments, which is to be read in connection with the accompanying drawings.

BRIEF DESCRIPTION OF THE DRAWINGS

FIG. 11 is a flow diagram of another implementation of steps 504 and 506 of FIG. 5 according to an embodiment of the present invention.

DETAILED DESCRIPTION OF PREFERRED EMBODIMENTS

1. Problem Definition

The problem at hand can be formally described as follows.

Given d lists $ds_1, \ldots, ds_d$ of (ID, value)-pairs sorted by increasing value where each list contains the same set of IDs, an operation inspectNext(i) that returns the pair with the next smallest value in list $ds_i$, and also returns the values of the same ID in all other lists, a cost function costNext(i) that assigns a cost to inspectNext(i) in the current state of the algorithm, and a monotonic aggregation function s that maps d values to a new value, find the top k pairs $(ID_1, s(v_{11}, \ldots, v_{1d})), \ldots, (ID_k, s(v_{k1}, \ldots, v_{kd}))$ according to their value, where $(ID_i, v_{i1}), \ldots, (ID_i, v_{id})$ is an element of $ds_1, \ldots, ds_d$, respectively, for all i, by issuing a sequence of operations (inspectNext$(i_1), \ldots,$ inspectNext$(i_n)$) to the lists such that costNext$(i_1)+\ldots+$costNext$(i_n)$ is minimized.

Figure 1:
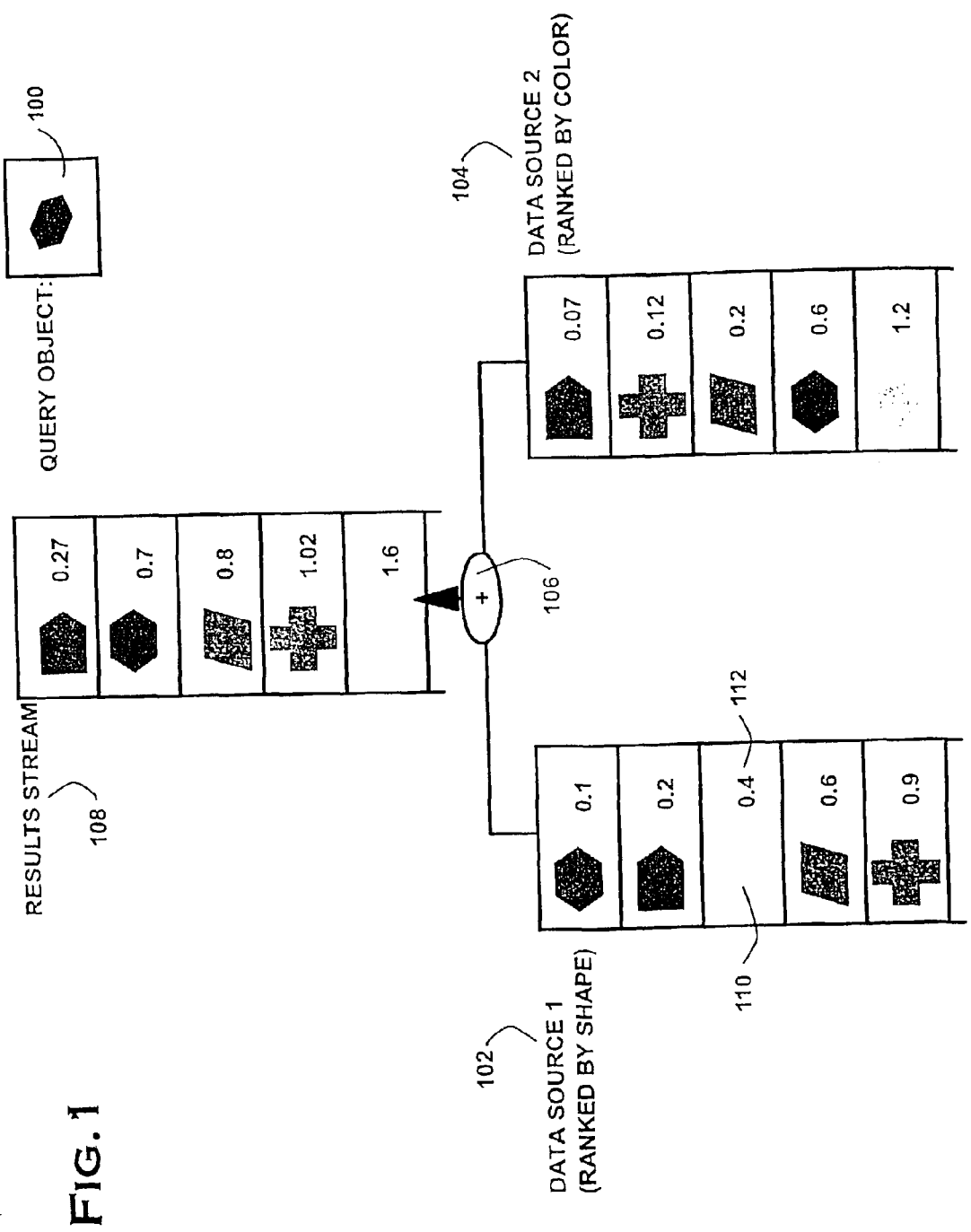
FIG. 1 is a graphical illustration of a multi-feature query example involving a color feature and a shape feature as discussed in the present invention.

FIG. 1 illustrates an example for a multi-feature query having different access costs. Given an object (100) with a certain color and shape, the goal is to retrieve the best matching objects with respect to color and shape from some database. However, in this example, there is no service that allows to query for both color and shape. Instead, there is one service that delivers the objects in the database ranked by shape (102), and one service that delivers the objects ranked by color (104). One reason for having two separate mechanisms might be that shape-support was added later and had to be stored using a different index structure.

Note that the ranking is done relative to the query object and therefore is different for each query. A green object (110) is, for example, ranked third according to shape for this particular query (100) but it may have a different ranking for a different query. The similarity of an object to the query object is assumed to be returned together with the object as a real value (112). The smaller the value, the closer the match according to the criterion.

In order to retrieve a stream (108) of best matches according to color and shape, the values of the objects in both incoming streams (102 and 104) have to be combined by some monotonic function (106). In this example, the combining function (106) is simply the sum of the color and shape values. When combining all the values of identical objects in both streams, the outgoing stream (108) results, with objects now ranked by the sum of color and shape similarity. Note that this example comprises only five objects. In reality, thousands or millions of objects might occur in each stream and inspecting all of them would not be feasible. It is therefore a goal to obtain the first k objects in the outgoing stream (108) merely by reading a few objects at the beginning of each incoming stream (102 and 104). As described in the formal problem definition, each such "sequential access" is coupled with random accesses to each other incoming stream to obtain the values of the identical object in these other streams.

For a more concrete example, assume that the first two objects are requested for the given example. There is a large variety of ways to answer this query. Among them are the following (using the notation from the formal definition):

1. perform 4 "inspectNext(1)", followed by 2 "inspectNext(2)", and 2. perform 1 "inspectNext(1)", followed by 4 "inspectNext(2)".

The cost for the two query, strategies is therefore 1. 4*costNext(1)+2*costNext(2), and 2. 1*costNext(1)+4*costNext(2), respectively.

Recall that "costNext(i)" has to include the sequential read cost for stream i as well as the random access cost to all other streams. The overall cost for the two query strategies is therefore 1. 4*(sequential(1)+random(2))+2*(sequential(2)+random(1)), and 2. 1*(sequential(1)+random(2))+4*(sequential(2)+random(1)), respectively, where "sequential(i)" and "random(i)" denotes the sequential and random read cost, respectively. This is a simplification for the ease of readability since in reality, the sequential read cost can also depend on the rank of the next object to retrieve. The present invention will handle these cases as well.

Clearly, the best query strategy depends on the contributing costs. Assume, random(1)=10, random(2)=1, sequential(1)=100, and sequential(2)=5. These numbers could occur in reality since searching by shape is typically more expensive than searching by color. The overall cost for the two strategies then becomes 1. 4*(100+1)+2*(5+10)=434, and 2. 1 * (100+1)+4 * (5+10)=161, respectively.

The second strategy is therefore clearly the more cost efficient one of the two.

This example teaches the importance of taking access costs into account when making decisions about query evaluation plans. Matters become even more severe when the different data sources are distributed over a network or require very long retrieval times. A good query plan can then reduce the execution time from tens of minutes to just seconds. It is also important to note that this decision cannot be made before query execution since the actual costs depend on the query at hand and may not be constant. The present invention therefore discloses the use of a dynamic query optimizer for combining ranked streams. In this invention, the query plan is updated dynamically while objects are read from incoming streams in order to keep the overall cost at a minimum. The invention bases its decision for the future read strategy on past knowledge and future cost predictors. Section 6 describes the dynamic optimization algorithm in detail.

2. Interface

This section describes a general interface for querying and acquiring information about data streams. Since the present invention can be seen as a data stream itself (namely one generated by combining multiple other data streams), the interface described in this section is also a preferred interface of the present invention.

It is assumed that each data stream supplies ways to initialize the stream, query for the next best matches, and estimate the cost of an operation. In the following, each function of the interface is described with its syntax and semantics.

initialize( . . . )

Initializes a data stream. This may include opening files, initializing index structures, and—in the case of a stream comprising multiple other streams— initializing all incoming streams.

initGetNext($q_1$: object, . . . , $q_d$: object [, s: monotonic fct ])

Starts a ranked retrieval from the stream. Since the ranking is computed relative to a query object, as described in section 1, this query object has to be provided as a parameter. If the data source consists of a single stream, only one query object is required (d=1). If the source is the combination of d streams, one query object per stream has to be provided. For example, there may be one object that describes the desired color and one object that describes the desired shape. Note that some or all of the provided d query objects may be identical. In the example in FIG. 1, one query object (100) defines both the color and shape of the desired object to retrieve. Additionally, if multiple streams are used, a monotonic combining function s, such as the sum (106) in FIG. 1, has to be provided. No assumptions are made about the concrete implementation of the objects or how they are referenced since these decisions depend on the underlying database system.

In order to start a ranked retrieval, this function may for example sort all objects according to their closeness to the query object. In case an index structure is present, this function may initialize the traversal of the index structure. If this stream is combined of multiple streams, this function may call initGetNext($q_1$), . . . , and initGetNext($q_d$) in stream 1, . . . , and stream d, respectively.

hasNext( ): boolean
    This function returns true if there are more objects to be retrieved from the stream. If the length of the stream is known, this function simply has to check whether the number of retrieved objects is less than the length of the stream. The same holds for multiple streams since each incoming stream has to have the same number of objects.

getNextK(k: integer): ($o_1$: object, . . . , $o_k$: object)
    This is the core function of the data stream retrieval interface. The purpose of this function is to return the next k best-matching objects from the stream where $o_1$ is the best match and $o_k$ is the worst match. For example, if 12 objects were already retrieved from the stream, a call of getNextK(3) would retrieve the 13th, 14th, and 15th best-matching objects. The ranking of the objects depends on the query object(s) $q_1$, . . . , $q_d$, and the aggregation function s (if multiple streams are used). As can be seen from this example, the retrieval is incremental. Until initGetNext is called again, subsequent getNextK-calls retrieve the next matches based on what was already retrieved. This is desirable for search engines where the user can look through the first few query results on a page and then click on a button to get the next best results presented, and so on until the desired result is found. Note also that the retrieval follows a "pull model". This means that the next results are delivered only on request. In a multi-stream setting such a request typically triggers requests to the incoming streams.

getDistance(o: object): float
    While the last function was a way of accessing a stream sequentially (beginning from the best match, towards the worst match), this function provides random access to a stream. For a given object o, it returns the value, or distance, according to the query object(s) $q_1$, . . . , $q_d$, and the aggregation function s (if multiple streams are used).

getMaxDistance( ): float
    This function returns an upper bound on the largest possible distance to be returned by getDistance.

seqCostEstimator(from: integer, to: integer, steps: integer): ($cost_1$: float, . . . , $cost_{steps}$: float)
    This function returns the estimated costs for performing sequential stream accesses. These costs are defined as the predicted response times (in seconds) for a call of getNextK(k) after initGetNext was called. The value of k varies between from and to at steps equi-distant steps. The costs should include at least disk access and network transfer times (if applicable). The stream may use past performance measurements to estimate these costs. This function is optional.

randCostEstimator( ): float
    This function returns the estimated average cost for performing a random stream access. This cost is defined as the predicted response time (in seconds) for a call of getDistance and should include at least disk access and network transfer times (if applicable). This function is optional.

distEstimator(from: integer, to: integer, steps: integer): ($dist_1$: float, . . . , $dist_{steps}$: float)
    This function returns the estimated distances encountered during sequential stream accesses. The values returned are the distances that are predicted to be returned by calls of getNextK(k) after initGetNext was called. The value of k varies between from and to at steps equi-distant steps. The stream may use information about past getNextK-calls to estimate these distances. This function is optional.

The next section details a preferred architecture to be used by this invention in order to solve the problem defined in section 1 while being in compliance with the interface defined in section 2.

3. System Architecture

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 2:
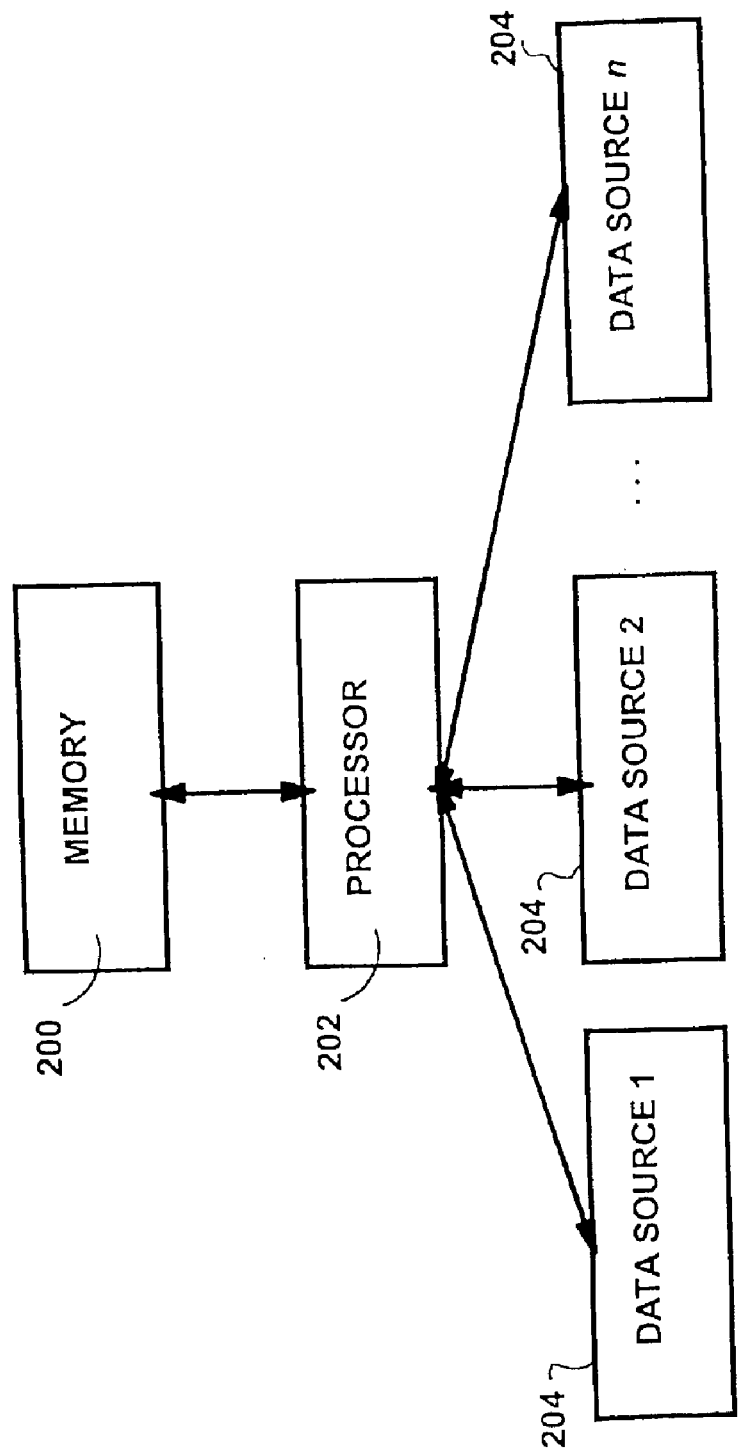
FIG. 2 is a high level block diagram of an applicable hardware system according to an embodiment of the present invention.

In the context of FIG. 2, an exemplary hardware architecture for processing multi-feature queries formed in accordance with the invention is described. FIG. 2 illustrates an apparatus according to the invention which may be used for performing multi-feature queries with dynamic cost-conscious optimizations and which complies with the interface described in section 2. The apparatus includes a processor (202) coupled to a memory (200), and one or more data sources (204). It is to be appreciated that the processor (202) controls and/or performs the methodologies (e.g. dynamic query plan computation) associated with the invention. The memory (200) is used by the processor (202) in performing such operations, e.g., storing a list of objects returned by the processor in response to a particular query, or storing a data sample for cost estimation. Each data source (204) is an apparatus capable of delivering multimedia objects ranked by their similarity to a given criterion (e.g. color similarity). No assumptions are made about the inner workings of a data source (204); it may be implemented using a stand-alone index structure, a full-fledged database system, or it may itself be realized by an apparatus as in FIG. 1. The only assumption made is that each data source (204) complies with the interface described in section 2. It should furthermore be noted that the data sources (204)

may originate from the same database or from two or more different databases. The only assumption made is that the set of objects stored in each database is identical (but may be ranked by different feature attributes). Additionally, the data sources (204) may be located on the same computer or distributed among two or more different computers in a network. In the latter case, additional network communication costs may arise when the processor (202) exchanges data with a data source (204). The present invention is especially suited for the latter case since it can adjust dynamically to changes in the access cost.

For an incoming "getNextK"-request, the processor (202) can access any of the one or more sources (204) in any order by issuing any of the requests described in section 2. The processor (202) can furthermore use the memory (200) to store intermediate and/or final results and auxiliary information, such as data samples or histograms. Once the processor (202) detects that the top-k results are found, they can be delivered to the requester.

In various exemplary embodiments, software used to implement the methods outlined in the present invention, and the instructions derived therefrom, are all comprised of instructions which, when read and executed by a computer system, causes the computer system to perform the necessary steps to implement and/or use the present invention. Under control of an operating system, the software and the instructions derived therefrom, may be loaded from an appropriate data storage device and into memory of a computer system for use during actual operations.

Those skilled in the art will recognize that the exemplary architecture illustrated in FIG. 2 is not intended to limit the present invention. Those skilled in the art will appreciate that other alternative architectures may be used without departing from the spirit and scope of the present invention.

In the following sections, the methods implemented by the processor (202) are discussed.

4. Basic Algorithm

Fagin's Threshold Algorithm (TA) (Ronald Fagin, Amnon Lotem, and Moni Naor, "Optimal Aggregation Algorithms for Middleware," Proceedings of the ACM Symposium on Principles of Database Systems, 2001, pp. 102–113) is one possible algorithm to implement "getNextK". Even though it is not cost-concious, it is discussed in this section since it will help understand the present invention.

Figure 3:
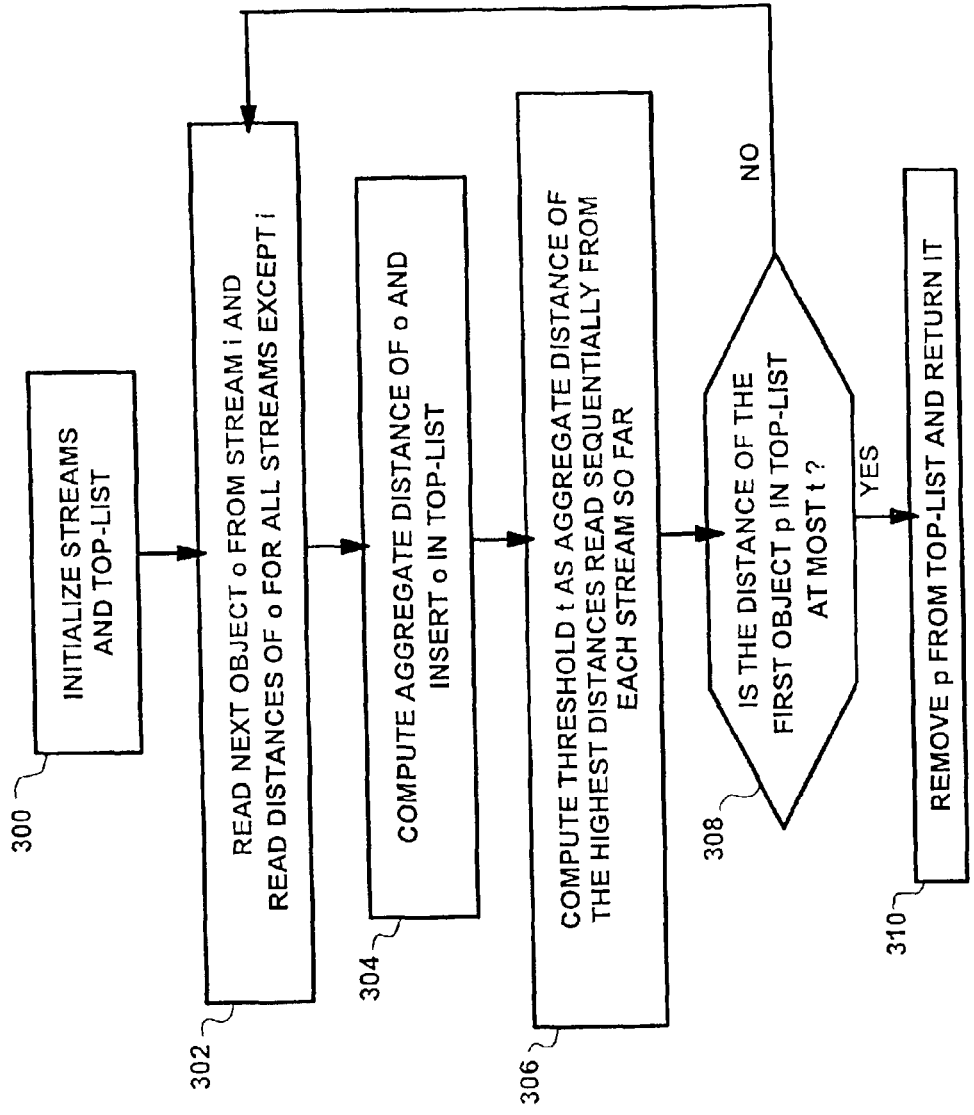
FIG. 3 is a flow diagram of an incremental version of Threshold Algorithm as discussed in the present invention.

FIG. 3 provides a flow diagram of an incremental version of TA. Before the first "getNextK"-call can be answered, the algorithm is initialized in step 300. In this step, the incoming streams are initialized by calling "initGetNext" for each of them and a list is initialized that stores the best candidates found so far sorted by their distance value. In the next step (302), an object o is read from any of the streams using "getNextK(1)" on the selected stream. Let i be the number of the selected stream. In order to obtain the aggregated distance of the read object, the distance of this object in all streams except i is requested via "getDistance(o)"-calls. Now that all distances for o are known, the aggregate distance can be calculated in step 304. If the distances for o are $v_1, \ldots, v_d$, the aggregate distance is given by $s(v_1, \ldots, v_d)$. Object o is then inserted in the top-list according to its aggregate distance. In step 306, a threshold value t is computed as follows. Assume, the highest distance read via "getNextK(1)"-calls in stream 1 is $h_1$, and the highest distance read in stream 2 is $h_2$, and so on. Then t is defined to be $s(h_1, \ldots, h_d)$. This threshold value is used in step 308 in a termination condition: if the aggregate distance of the best object p in the top-list is less than or equal to t, this object p can be removed from the top-list and returned to the caller as the next best match in step 310. Otherwise, more objects need to be fetched and the algorithm continues with step 302.

The correctness of the termination condition stems from the fact that the aggregation function is monotonic. The monotonicity of a function is defined as follows:

The function $f: \mathbb{R}^d \rightarrow \mathbb{R}$ is monotonic if $\forall \vec{v_1}, \vec{v_2} \in \mathbb{R}^d$, and $\vec{v_1} \geq \vec{v_2}$ elementwise, then $f(\vec{v_1}) \geq f(\vec{v_2})$.

The present invention makes the same assumption and can therefore employ the same termination condition. Note that this basic algorithm leaves a lot of leeway in step 302. The best choice of i (the next stream to read) required to minimize the overall execution cost and response time is far from obvious. The present invention teaches a novel and nonobvious way of making this choice based on cost predictions.

Note that in a concrete implementation, only step 300 would be executed for a call of "initGetNext". A call of "getNextK(1)" would start directly with a check of condition 308 since there may be already objects in the top-list that can be removed and returned. Calls of "getNextK(k)" are assumed to be translated into k calls of "getNextK(1)". The concrete implementation for each interface function of the present invention can be found in section 6.

5. A Geometrical View of the Basic Algorithm

Figure 4:
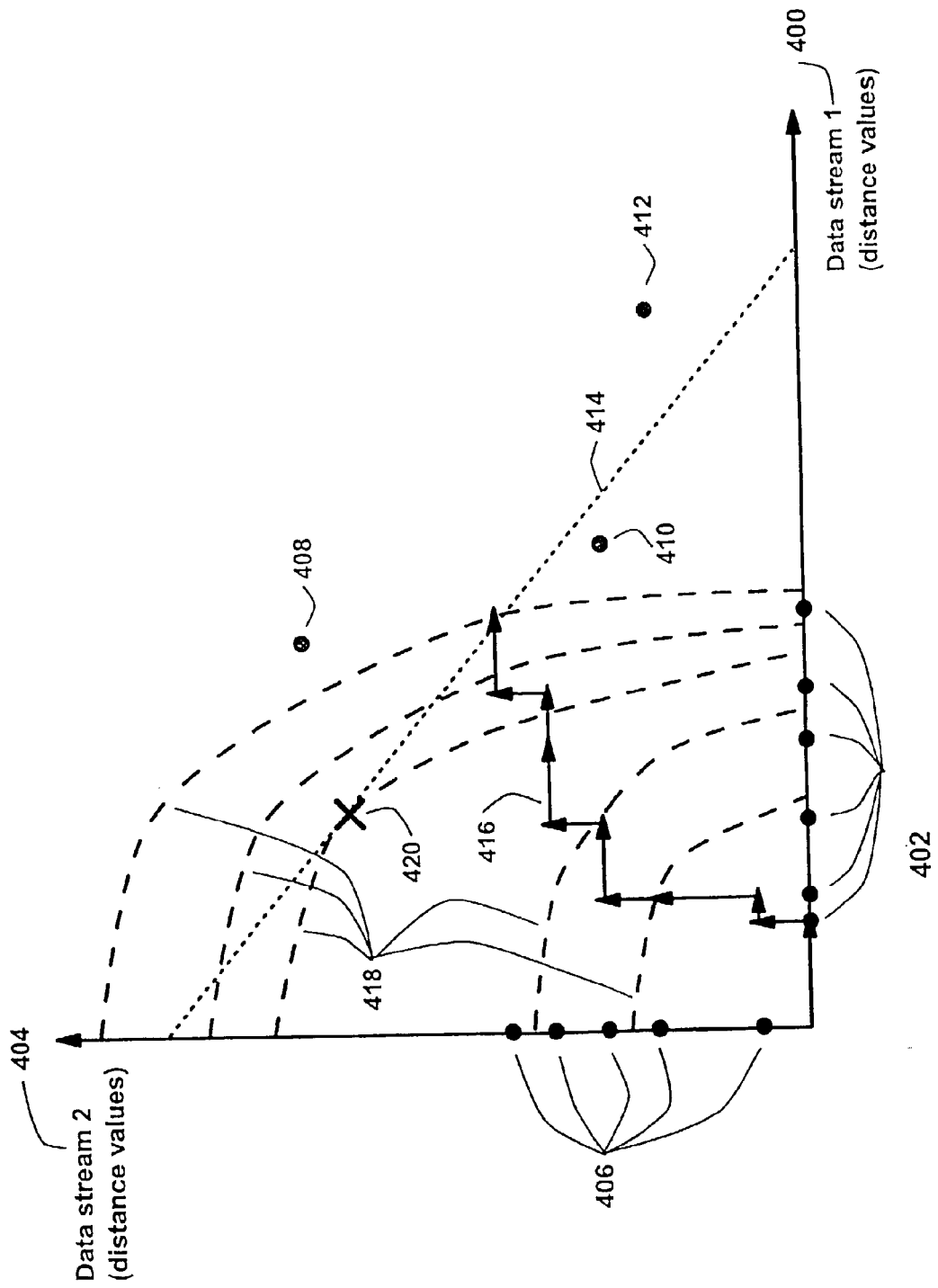
FIG. 4 is a graphical interpretation of the Threshold Algorithm as discussed in the present invention.

The execution of the algorithm presented in section 4 can be viewed as a sequence of location changes in a d-dimensional space. FIG. 4 illustrates an example where d=2. The x-axis (400) represents the distance values (402) of data stream 1 and the y-axis (404) represents the distance values (406) of data stream 2. A location (x,y) in this 2-dimensional space represents the state of the algorithm where the highest value read from stream 1 is x and the highest value read from stream 2 is y. Each sequential read access to data stream 1 therefore causes an update of the x-coordinate and a movement to the right, whereas a sequential read access to stream 2 causes an update of the y-coordinate and an upward movement. The overall read sequence of the algorithm can therefore be viewed as a query execution path (416) in this 2-dimensional space.

Pairs of values from stream 1 and stream 2 that belong to the same object, are marked as dots (408, 410, 412) in FIG. 4. Such a pair could be for example the color and shape similarity of an object. Once the x-coordinate (or y-coordinate) of such a pair is read via sequential access in step 302 of TA (shown in FIG. 3), the corresponding y-coordinate (or x-coordinate) is also read due to the additional random access in step 302. Therefore, the values of all red dots to the left of and/or below the current location are known and their aggregate values are kept in the top-list.

By computing the aggregate value of the current location (which is the aggregate score obtained from the current x and y-coordinate), the current threshold value can be obtained. This corresponds to step 306 in FIG. 3. Thereby, a threshold value can be assigned to each possible location on the x-y-plane. Note that this mapping of (x,y)-locations to threshold values is defined by the monotonic aggregation function s. The values of this function increase with increasing x and/or y-coordinate. The line 414 in FIG. 4 represents an equi-threshold line for the threshold value at the current location of the algorithm. The shape of the equi-threshold lines depends on s.

TA terminates as soon as the first object in the top-list has an aggregate score less than the threshold. This check is performed in step 308. In the example in FIG. 4, object 410 fulfills this property since it is to the lower left of the equi-threshold line (414). It can therefore be returned. Note however that any query execution path (416) that terminates on a location along the equi-threshold line (414) will return the same object. Clearly, there are many such paths. And each possible path results in a different query cost. The goal of the present invention is therefore to dynamically generate a query execution path that minimizes this cost.

Similar to the aggregate function, the cost can also be viewed as a function mapping the state of the TA (or the location in the d-dimensional space) onto an accumulated cost value. Also similar to TA, this cost function is monotonic: the more is read from the streams, the higher the accumulated cost. In the example in FIG. 4, the equi-cost lines (418) of an examplary cost function are shown. The location on the equi-threshold line (414) with the lowest accumulated cost is 420. An objective of the present invention is to estimate this location and to generate a query plan to reach it by using cost predictions.

6. Framework for Dynamic Optimization

Figure 5:
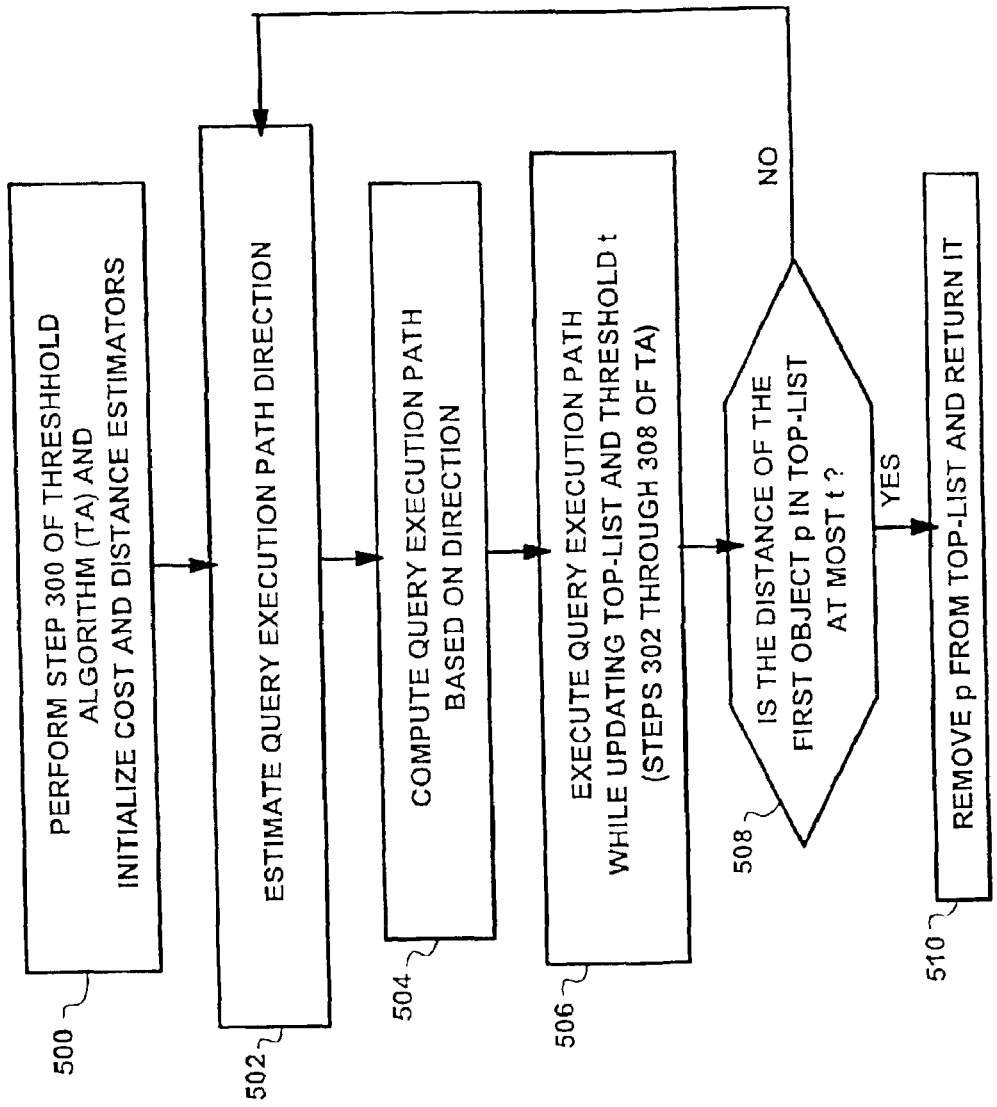
FIG. 5 is flow diagram for a dynamic optimization algorithm according to an embodiment of the present invention.

A flow diagram for the dynamic optimization algorithm, which is the core of the present invention, is given in FIG. 5. In step 500, the same initialization steps as for TA (step 300) are performed. Additionally, the cost and distance estimators are initialized. The present invention allows for a variety of estimators. They will be described in section 6.4 in more detail. In step 502, the algorithm estimates the direction from the current location (or state) of the algorithm to the location (or state) on the equi-threshold line with the lowest accumulated cost. The present invention allows for a variety of heuristics to be used. These heuristics can be based on the cost and/or density estimators and are discussed in section 6.2. In step 504, the query execution path is computed based on the density estimators. This path describes the sequence of sequential read accesses to each of the streams. Step 504 is described in greater detail in section 6.3. Step 506 executes the query path computed in step 504. This is accomplished by executing steps 302 through 308 of TA with minor modifications: the value of i in step 302 is now determined by the query path and the condition in step 308 may become true earlier, in case the query path ends before the threshold line is reached. The query path execution is also detailed in section 6.3. Finally, steps 508 and 510 are identical to steps 308 and 310 of TA.

6.1. Initialization

Figure 6A:
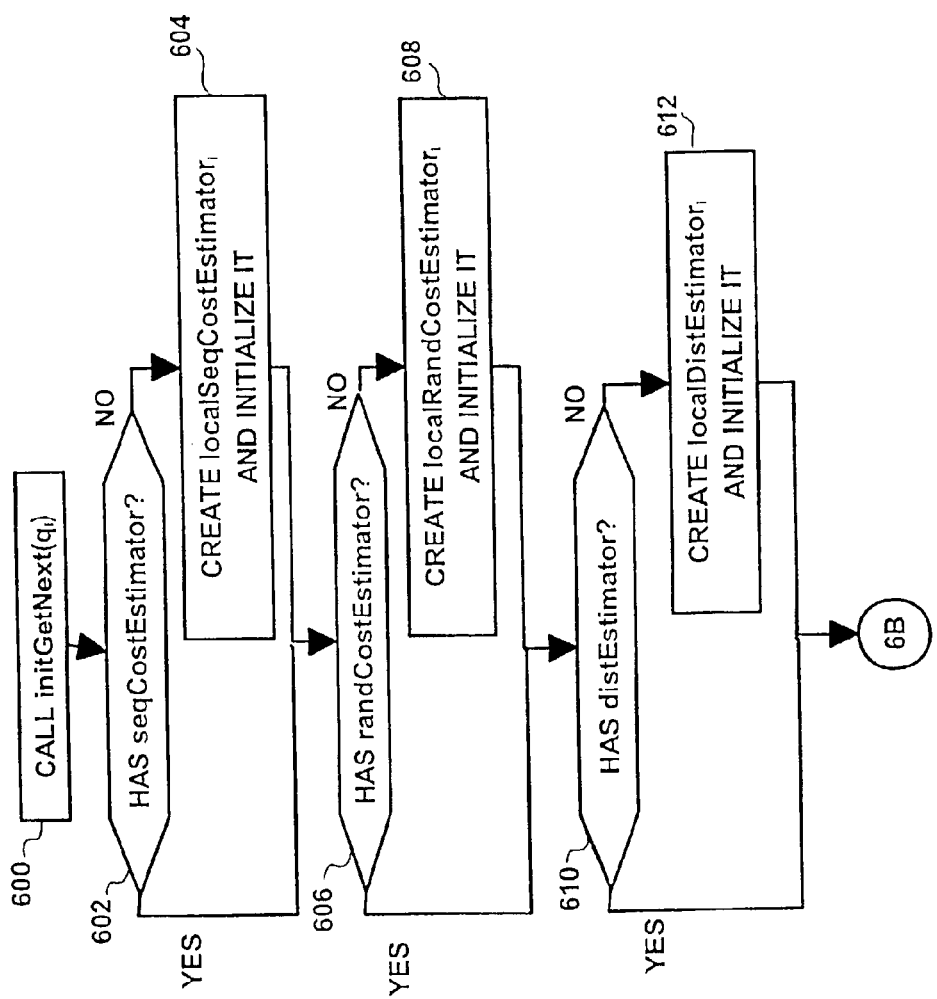
FIGS. 6(a) and (b) is a flow diagram of the initialization step 500 of FIG. 5 according to an embodiment of the present invention.

FIGS. 6A and 6B show a flow diagram of the initialization step 500 in FIG. 5. It can be understood as a refinement of step 500 and therefore as another preferred embodiment of this step. During initialization, each incoming stream i is initialized via an "initGetNext($q_i$)"-call (600) where $q_i$ denotes the ith query object as defined in section 2.

This is followed by the initialization of the cost and distance estimators. Each stream needs to have a cost estimator. In case a stream does not support the "seqCost-Estimator" and "randCostEstimator" functions, corresponding estimators have to be managed by the present invention. This is checked in steps 602 and 606 for each stream. If a sequential cost estimator is required for a stream i, a local estimator is created and initialized in step 604. Similarly, if a random cost estimator is required for a stream i, a local estimator is created and initialized (608). In case stream i does not support the "distEstimator"-function (610), a local estimator is created and initialized (612). The estimators are discussed in more detail in section 6.4.

If desired by the user and the size of the main memory (200) is sufficient, a correlation sample can be created (614). This sample improves the accuracy of the threshold estimation required in step 502 (the details are discussed in section 6.2.1) at the cost of additional random accesses to all streams. If the sample needs to be created, an array "sample" of size h*d is allocated and h (a user-provided value) object IDs are created randomly (616). Then, h "getDistance"-calls are issued to each stream to obtain the corresponding distances which are stored in the array "sample" (618). Here, d denotes again the number of streams.

6.2. Direction Estimation

Assume the algorithm is currently in a state where the highest value read from stream 1 is $x_1$, the highest value read from stream 2 is $x_2$, and so on. As discussed in section 5, this state can be viewed as a location $(x_1, \ldots, X_d)$ in a d-dimensional space. The goal of step 502 is now to estimate the direction from the current location in which the cost function c reaches a minimum (420) on the threshold boundary B. By "threshold boundary" it is meant the set of points for which the aggregation function s is at least t:

$$B:=\{x\in\mathbb{R}^d:s(x)\geq t\}$$

where t denotes an estimate on the threshold value for which condition 308 becomes true.

Figure 7:
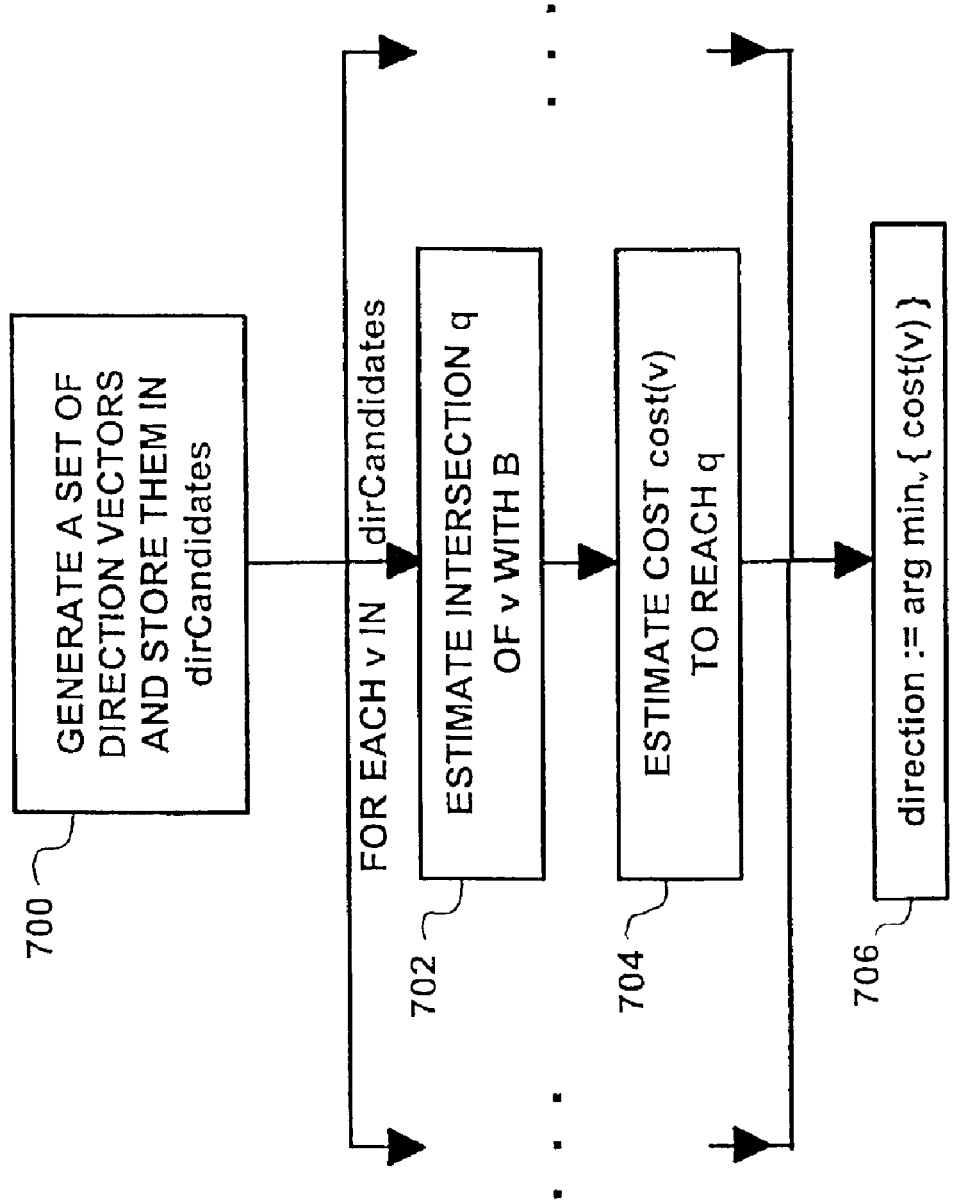
FIG. 7 is a flow diagram of a direction estimator according to an embodiment of the present invention.

There are different ways of estimating this direction. Each can be seen as a refinement of step 502 and will be discussed in the following. FIG. 7 shows the basic steps of the direction estimator. First, a set of direction vectors is generated and stored in a variable dirCandidates (700). These vectors can be generated in different ways. Among the preferred embodiments are:

1. generate the d unit vectors,
2. generate $g^{d-1}$ vectors by representing them in polar coordinates $(r, \phi_1, \ldots, \phi_{d-1})$ where r is set to 1 and each $\phi_i$ is chosen between 0 and $\pi/2$ in g steps (g is user-defined).

For special cases of c and s, the optimal direction can be computed directly via linear or non-linear optimization. In this case, step 502 is replaced by the corresponding optimization algorithm. The details are however beyond the scope of this invention.

Once the direction vectors are generated, for each vector v, the point q in B closest to x lying on a straight line starting at x and going in direction v is computed (702). In other words, $$q:=\arg\min\{|x-p|:p\in B\cap\{x+\lambda v:\lambda\geq 0\}\}.$$

In step 704, the accumulated cost for reaching q from x is estimated. When the costs for all directions in dirCandidates are computed, the vector with the smallest cost is stored in variable direction (706). The preferred embodiments of steps 702 and 704 are given next.

6.2.1. Threshold Intersection Estimation

Figure 8:
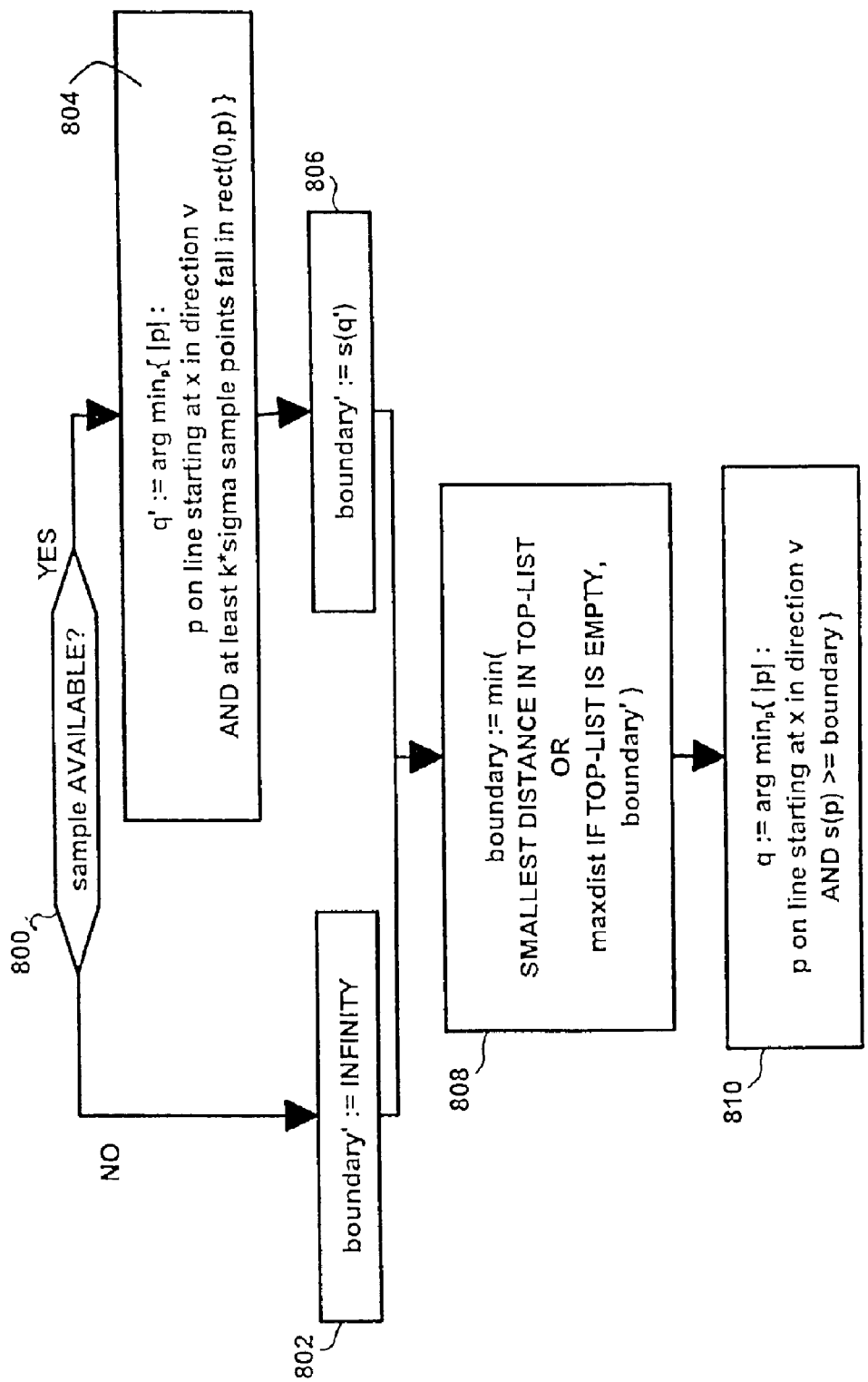
FIG. 8 is a flow diagram depicting in more detail the procedure in step 702 of FIG. 7 according to an embodiment of the present invention.

FIG. 8 illustrates a refinement of step 702 and is to be understood as a preferred embodiment of step 702. Step 800 checks whether a sample was created during initialization (500). If no sample is available, the variable boundary' is set to infinity (802). Otherwise, boundary' is set to s(q') (806) where q' is the location closest to the origin on a line starting from x in direction v such that a rectangle with corners at q' and the origin covers at least $\lceil k\sigma \rceil$ points (804). Or, more formally:

$$q':=\arg\min\{|p|:p\in\{x+\lambda v:\lambda\geq 0\}\wedge|\text{inrect }(0,p)|\geq\lceil k\sigma\rceil\}$$

where "inrect(x,y)" denotes a function that returns the set of sample points that fall within the rectangle with corners at x and y. The variable k stores the rank of the next object to be returned by the combining algorithm. Finally, σ stands for the sampling rate used. One way of computing q' efficiently is by using a bisection algorithm since |inrect(0,p)| is monotonically increasing with |p|.

Once boundary' is obtained, the minimum of the smallest distance of the objects in the top-list and boundary' is calculated and stored in the variable boundary (808). In case the top-list is empty, the smallest distance is assumed to be the maximum possible distance which is $s(\text{getMaxDistance}_1, \ldots, \text{getMaxDistance}_d)$, or in other words the aggregate distance of the maximum distances of all streams.

With the value of boundary determined, step 810 computes the location q along a line starting from x in direction v where s has this value. Or, more precisely:

$$q := \arg\min\{|p| : p \in \{x + \lambda v : \lambda \geq 0\} \wedge s(p) \geq \text{boundary}\}.$$

One way of computing q efficiently is by using a bisection algorithm since s(p) is monotonically increasing with |p|.

6.2.2. Cost Estimation

Figure 9:
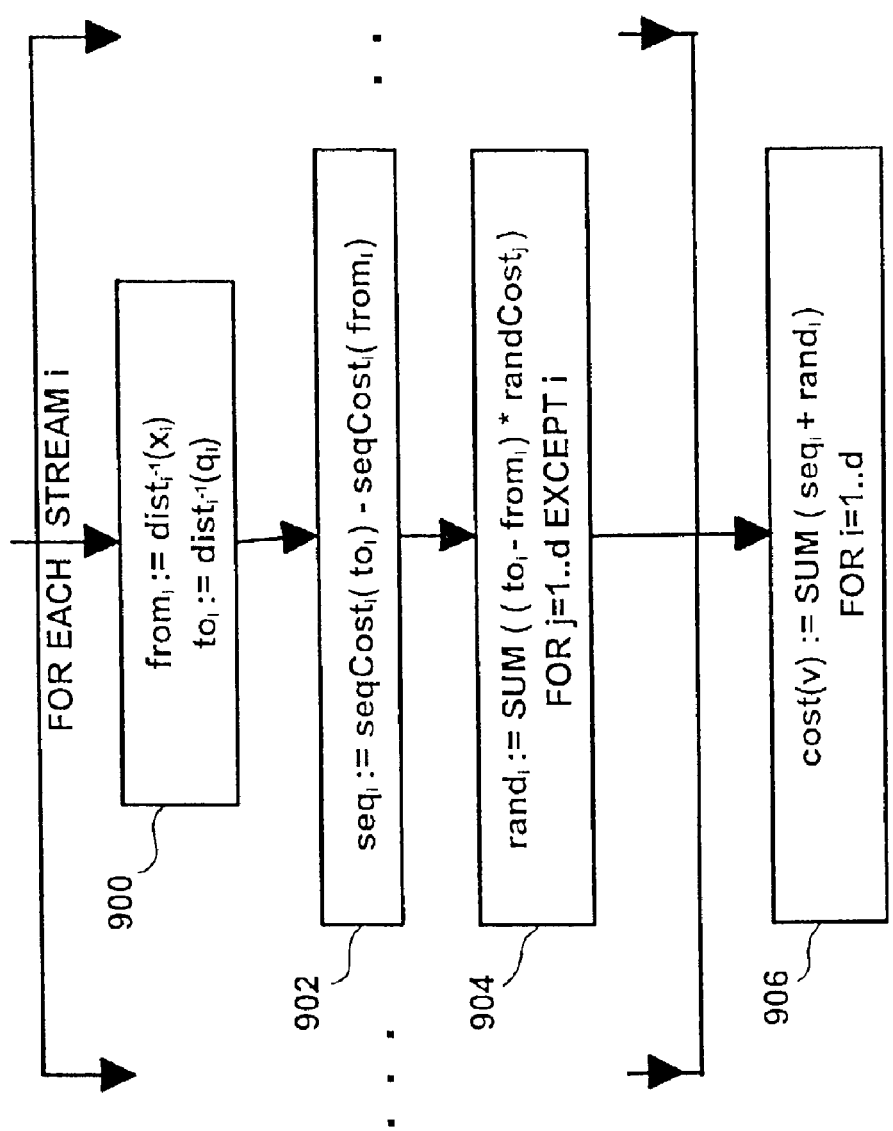
FIG. 9 is a flow diagram depicting in more detail the procedure in step 704 of FIG. 7 according to an embodiment of the present invention.

The cost for reaching q from the current location x is determined by using the distance and cost estimators. The refinement of step 704 is illustrated in FIG. 9. First, the required number of sequential reads is determined for each stream in step 900. This number is obtained by the inverse of the distance estimator. Since the highest value read from stream i needs to change from $x_i$ to $q_i$, the overall number of sequential reads issued to stream i needs to change from $\text{dist}^{-1}(x_i)$ to $\text{dist}^{-1}(q_i)$, where $\text{dist}^{-1}$ denotes the inverse of the distance estimator, i.e. it maps a distance to a number of read steps. One way of obtaining the inverse is via bisection since the distance function is monotonic.

Step 900 stores the values of $\text{dist}^{-1}(x_i)$ and $\text{dist}^{-1}(q_i)$ in variables $\text{from}_i$ and $\text{to}_i$, respectively. In step 902, the cost estimators are used to calculate the difference in cost between reading from$_i$ and to$_i$ objects. This difference is given as $$\text{seq}_i := \text{seqCost}_i(\text{to}_i) - \text{seqCost}_i(\text{from}_i)$$

and is stored in a variable seq$_i$ (902). Note that this encompasses only the sequential read cost so far. In step 904, the overall random cost is calculated by summing up the costs for the random accesses to all streams except i. This cost is given as $$\text{rand}_i := \sum_{j \neq i} (\text{to}_i - \text{from}_i) * \text{randCost}_j()$$

and is stored in a variable rand$_i$ (904). In step 906, all sequential and random access costs of all streams are summed up and stored in a variable cost(v).

6.3. Query Plan Computation & Execution

This section explains two preferred embodiments of steps 504 and 506. Common to both embodiments is that they assume that a value radius is given which determines how far the execution algorithm should "walk" along vector v. As soon as |x−p|>radius (where x denotes the last location and p denotes the current location of the algorithm), the query execution stops. It is preferable to choose smaller values for radius at the beginning and larger ones later since the algorithm will become more stable the more past knowledge it has. The present invention does not restrict the heuristics used however.

Figure 10:
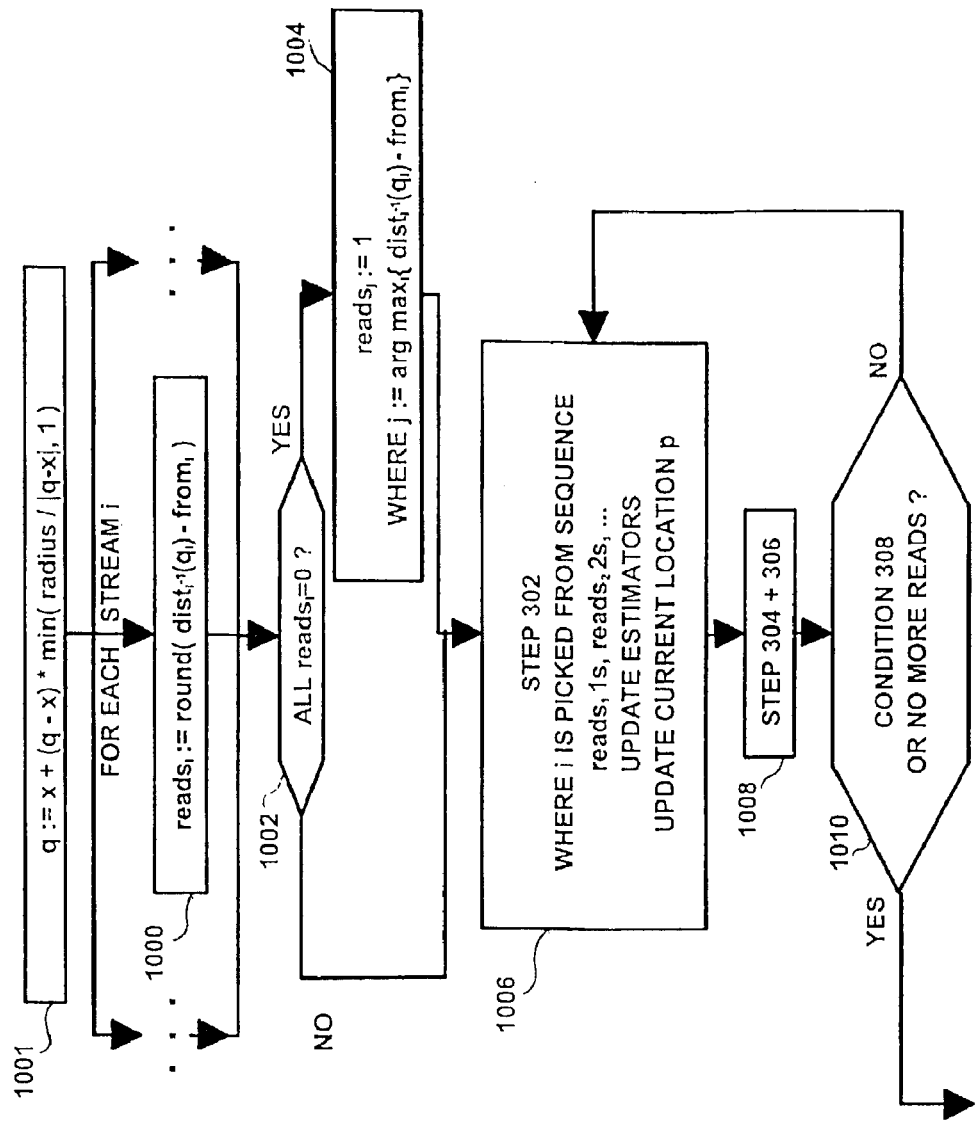
FIG. 10 is a flow diagram of an implementation of steps 504 and 506 of FIG. 5 according to an embodiment of the present invention.

The first embodiment of steps 504 and 506 is illustrated in FIG. 10. In step 1001, the target location q is modified such that it is in distance radius from the current location x. The algorithm then estimates the number of sequential read accesses required to reach q and stores them in a variable reads$_1$ for each stream i (1000). This estimate is obtained by using the inverse distance estimator and rounding to the next closest integer (1000). Step 1002 checks if all variables reads$_i$ are 0. If that is the case, the reads, of the stream for which the inverse distance estimator returned the largest value, is set to 1 (1004). In step 1006$_1$ the reads are issued to the streams similar to step 302 of TA. However, step 1006 is modified such that i is not picked arbitrarily but from the sequence $1, \ldots, 1, 2, \ldots, 2, \ldots, d, \ldots, d$, where the number of 1s is given by reads$_1$, and the number of 2s by reads$_2$, and so on. In addition, step 1006 updates the local density and/or cost estimators after each sequential and random read access. Step 1008 is identical to steps 304 and 306 of TA. Step 1010 is a modified version of step 308 of TA in that it additionally checks whether there are no more reads left in the sequence. If that is true, the query path execution stops; otherwise, it continues with step 1006.

The second embodiment of steps 504 and 506 is illustrated in FIG. 11. It interleaves both steps by constantly reevaluating the deviation from the desired path. The desired path is given by the line starting at x and continuing in direction v. In step 1100, the next expected distance is determined and stored in a variable dist$_i$ for each stream i using the distance estimators. Then, the next possible location p(i) is calculated for each direction i (1102). The next possible location in direction i is defined as the point whose components are identical to the current location p except for the ith component which is set to p+dist$_i$. Step 1104 picks the direction with the smallest expected distance between p(i) and the desired path as the next read direction i. Step 1106 is similar to step 302 of TA. However, step 1106 additionally updates the local density and/or cost estimators after each sequential and random read access. Step 1108 is identical to steps 304 and 306 of TA. Step 1110 is a modified version of step 308 of TA in that it additionally checks whether the new location p has a distance of at least radius from the old location x. If that is true, the query path execution stops; otherwise, it continues with step 1100.

The first embodiment can be modified in the following way: instead of issuing reads$_i$ "getNextK(1)"-requests to stream i, one request "getNextK(reads$_i$)" can be issued to that stream. This modification might be preferable in a networked setting because the number of requests is reduced. However, the algorithm may now "overshoot" the target q leading to unnecessarily transmitted objects.

6.4. Cost and Distance Estimators

This section summarizes the requirements for the cost and distance estimators.

A local estimator for sequential cost maps the sequence number n to the cost for performing the first n sequential read accesses to a stream. When initialized, this estimator should return 0. Furthermore, the mapping from sequence number to cost has to form a monotonically increasing function. Updates are handed to this estimator as (sequence number, cost)-pairs. A preferred embodiment for this estimator is an array of a certain fixed size that keeps track of the last sequential access costs. The prediction can then be performed using some extrapolation method. This is however beyond the scope of this invention.

A local estimator for random cost returns the expected cost for performing a random access to a stream. When initialized, this estimator should return 0. Updates are handed to this estimator as a single cost-value. A preferred embodiment for this estimator is a variable that keeps track of the average random access cost.

A local distance estimator returns the expected distance read from a stream. When initialized, this estimator should return the value "getMaxDistance( )" for its stream. Furthermore, the mapping from sequence number to distance has to form a monotonically increasing function. Updates are handed to this estimator as (sequence number, distance)-pairs. A preferred embodiment for this estimator is an array of a certain fixed size that keeps track of the last distances read. The prediction can then be performed using some extrapolation method. This is however beyond the scope of this invention.

When a sample is available, the local distance estimator should be based on the sample for higher accuracy. In that case, the sample obtained from each stream (step 618) is used as control points for an interpolation function. Again, the details of this interpolation are beyond the scope of this invention.

The external estimators provided by the streams can be created by a variety of ways. In the literature, uniformity-based, fractal dimensionality-based, histogram-based, and sampling-based predictors can be found. The present invention does not make any assumptions about their implementation other than the ones listed for the local estimators. Concrete implementations are therefore beyond the scope of this invention.

6.5. Interface Functions

The non-optional interface functions of section 2 are to be realized as follows:

initialize( . . . ) Call "initialize" in all incoming streams.

initGetNext($q_1$:object, . . . , $q_d$: object, s: monotonic fct) Call "initGetNext($q_1$)" in stream 1. Call "initGetNext ($q_2$)" in stream 2. . . . Call "initGetNext($q_d$)" in stream d. Execute step 500.

hasNext( ) boolean Call "hasNext( )" in stream 1, . . . , d. If at least one returned TRUE or top-list is not empty, return TRUE else return FALSE.

getNextK(k: integer):($o_1$: object, . . . , $o_k$: object) Execute from step 508 until 1st object is returned. Execute from step 508 until 2nd object is returned. Execute from step 508 until kth object is returned. Return these k objects in order.

getDistance(o:object): float Call "getDistance(o)" in stream 1, . . . , d. This yields d distances $dist_1$, . . . , $dist_d$. Return s($dist_1$, . . . , $dist_d$).

getMaxDistance( ): float Call "getMaxDistance( )" in stream 1, . . . , d. This yields d distances $dist_1$, . . . , $dist_d$. Return s($dist_1$, . . . , $dist_d$).

What is claimed is:

1. A method for optimally performing a similarity search for a query object using at least one data stream, each of the at least one data stream for a feature attribute and being a list in distance order, comprising the steps of:

determining a query plan using a cost-aware model; and executing the query plan to obtain at least one object using at least one of the at least one data stream;

wherein information related to the similarity search is returned once the distance of the first of the at least one obtained object is at most equal to a threshold value based on an aggregate distance of highest distances of objects obtained from each of the at least one data stream.

2. The method of claim 1, wherein determining the query plan comprises identifying an access sequence.

3. The method of claim 2, wherein identifying the access sequence comprises:

determining a location on an equi-threshold line with the lowest estimated cost; and generating the query plan to reach the location on the equi-threshold line.

4. The method of claim 1, wherein each of the at least one data stream has a cost estimator used by the cost-aware model.

5. The method of claim 4, wherein each cost estimator used by the cost-aware model includes a sequential cost function and a random cost function.

6. The method of claim 4, wherein at least one cost estimator used by the cost-aware model is based on a correlation sample.

7. The method of claim 4, wherein at least one cost estimator used by the cost-aware model is based on extrapolation from past costs.

8. A program storage device readable by a machine, tangibly embodying a program of instructions executable on the machine to perform method steps for optimally performing a similarity search for a query object using at least one data stream, each of the at least one data stream for a feature attribute and being a list in distance order, the method steps comprising:

determining a query plan using a cost-aware model; and executing the query plan to obtain at least one object using at least one of the at least one data stream;

wherein information related to the similarity search is returned once the distance of the first of the at least one obtained object is at most equal to a threshold value based on an aggregate distance of highest distances of objects obtained from each of the at least one data stream.

9. The program storage device of claim 8, wherein determining the query plan comprises identifying an access sequence.

10. The program storage device of claim 9, wherein identifying the access sequence comprises:

determining a location on an equi-threshold line with the lowest estimated cost; and generating the query plan to reach the location on the equi-threshold line.

11. The program storage device of claim 8, wherein each of the at least one data stream has a cost estimator used by the cost-aware model.

12. The program storage device of claim 11, wherein each cost estimator used by the cost-aware model includes a sequential cost function and a random cost function.

13. The program storage device of claim 11, wherein at least one cost estimator used by the cost-aware model is based on a correlation sample.

14. The program storage device of claim 11, wherein at least one cost estimator used by the cost-aware model is based on extrapolation from past costs.

15. A method for optimally performing a similarity search for a query object using a plurality of data streams, each of the plurality of data streams for a feature attribute and being a list in distance order, comprising the steps of:

determining a query plan using a cost-aware model, the query plan for obtaining at least one object using at least one of the plurality of data streams similar to the query object by the feature attribute associated with each of the at least one of the plurality of data streams; and executing the query plan to obtain the at least one object using the at least one of the plurality of data streams;

wherein information related to the similarity search is returned once the distance of the first of the at least one obtained object is at most equal to a threshold value based on an aggregate distance of highest distances of objects obtained from the each of the at least one of the plurality of data streams.

16. The method of claim 15, wherein the step of determining a query plan using a cost-aware model comprises determining a query plan using a cost-aware model that dynamically minimizes the query cost of the query plan, the query cost including cost of accessing the feature attribute associated with the each of the at least one of the plurality of data streams.

17. The method of claim 15, wherein a higher value for the aggregate distance represents a lower similarity between the query object and the objects obtained from the each of the at least one of the plurality of data streams.

* * * * *